(12) United States Patent
Neilan (10) Patent No.: US 10,380,517 B2
(45) Date of Patent: Aug. 13, 2019

(54) EVENT NOTIFICATION

(71) Applicant: NCR Corporation, Duluth, GA (US)

(72) Inventor: Michael James Neilan, Scotland (GB)

(73) Assignee: NCR Corporation, Atlanta, GA (US)

( * ) Notice: Subject to any disclaimer, the term of this patent is extended or adjusted under 35 U.S.C. 154(b) by 416 days.

(21) Appl. No.: 14/134,391

(22) Filed: Dec. 19, 2013

(65) Prior Publication Data

US 2015/0178664 A1 Jun. 25, 2015

(51) Int. Cl.
| | | |
|---|---|---|
| *G06Q 10/00* | (2012.01) | |
| *G06Q 10/06* | (2012.01) | |
| *G07F 19/00* | (2006.01) | |
| *G07F 9/02* | (2006.01) | |

(52) U.S. Cl.
CPC ... *G06Q 10/063114* (2013.01); *G07F 19/209* (2013.01); *G07F 9/026* (2013.01)

(58) Field of Classification Search
CPC ............ G06Q 10/00–50/00; G07F 1/00–19/00
USPC ................................................ 705/7.11–7.42
See application file for complete search history.

(56) References Cited

U.S. PATENT DOCUMENTS

| | | | | | |
|---|---|---|---|---|---|
| 5,519,669 A | * | 5/1996 | Ross | ........................ | G01S 15/02 340/541 |
| 5,984,178 A | * | 11/1999 | Gill | .................... | G06Q 20/1085 235/376 |
| 6,028,522 A | * | 2/2000 | Petite | .................... | G08B 25/008 340/3.1 |
| 6,038,309 A | * | 3/2000 | Ram | .................... | H04M 3/4228 379/201.02 |
| 6,109,522 A | * | 8/2000 | Force | ..................... | B65H 3/047 235/379 |
| 6,378,770 B1 | * | 4/2002 | Clark | ................. | G07D 11/0057 235/379 |
| 6,968,321 B1 | * | 11/2005 | Yu | ......................... | G06Q 20/108 379/27.04 |
| 7,077,312 B2 | * | 7/2006 | Putman | ................ | G06Q 20/108 235/379 |
| 7,093,750 B1 | * | 8/2006 | Block | ...................... | G07F 19/20 235/379 |
| 7,127,456 B1 | * | 10/2006 | Brown | .............. | G06F 17/30306 |
| 7,219,083 B2 | * | 5/2007 | Bellucci | .................. | G06Q 20/06 235/379 |
| 7,284,694 B2 | * | 10/2007 | Ferraro | ..................... | G07F 7/00 235/375 |
| 7,340,415 B1 | * | 3/2008 | Gasper | ............... | G06Q 20/1085 705/43 |
| 7,419,090 B2 | * | 9/2008 | Sawa | ................. | G07D 11/0069 235/379 |
| 7,545,816 B1 | * | 6/2009 | Coutts | ................ | G06Q 20/1085 235/375 |
| 7,752,306 B2 | * | 7/2010 | Komlenic | ............... | H04L 41/04 709/224 |

(Continued)

*Primary Examiner* — Alan S Miller (74) *Attorney, Agent, or Firm* — Schwegman, Lundberg & Woessner (57) ABSTRACT

A method of providing a service operation event notification is described. The method comprises: receiving at a management application an indication of a service event at a media terminal, where the indication includes (i) a service event type and (ii) a service event time; and updating the management application to record the type of event and a time associated with that event. The service event type may be an "engineer arrived" event, an "engineer left" event, or a replenishment scheduled event.

16 Claims, 4 Drawing Sheets

(56) References Cited

U.S. PATENT DOCUMENTS

| | | | | |
|---|---|---|---|---|
| 8,118,215 B2* | 2/2012 | Coventry | G06Q 20/1085 | 235/379 |
| 8,214,290 B1* | 7/2012 | Vannatter | G06Q 10/00 | 370/254 |
| 8,397,108 B1* | 3/2013 | Vannatter | G06Q 10/00 | 714/23 |
| 8,423,465 B1* | 4/2013 | McGraw, IV | G07F 19/209 | 705/43 |
| 8,448,849 B1* | 5/2013 | Jenkins | G06Q 20/1085 | 235/375 |
| 8,499,071 B2* | 7/2013 | Cipollone | G06F 11/3013 | 709/224 |
| 8,806,275 B1* | 8/2014 | Vannatter | G06Q 10/00 | 714/2 |
| 8,870,064 B2* | 10/2014 | Liddell | G06Q 10/06 | 235/379 |
| 9,208,479 B2* | 12/2015 | Fuentes | G06Q 40/02 | |
| 2002/0082994 A1* | 6/2002 | Herziger | G06Q 10/06 | 705/43 |
| 2002/0099634 A1* | 7/2002 | Coutts | G06Q 20/1085 | 705/35 |
| 2003/0217005 A1* | 11/2003 | Drummond | G06F 3/023 | 705/43 |
| 2004/0149819 A1* | 8/2004 | Shepley | G07F 19/20 | 235/379 |
| 2005/0029168 A1* | 2/2005 | Jones | B65H 15/00 | 209/534 |
| 2005/0096986 A1* | 5/2005 | Taylor | G06Q 20/20 | 705/16 |
| 2005/0131822 A1* | 6/2005 | Gardner | G06Q 20/1085 | 705/43 |
| 2005/0263583 A1* | 12/2005 | Schlabach | G06Q 10/06 | 235/379 |
| 2006/0078859 A1* | 4/2006 | Mullin | G03G 15/5016 | 434/219 |
| 2006/0233313 A1* | 10/2006 | Adams, Jr. | H04Q 3/0062 | 379/21 |
| 2006/0273151 A1* | 12/2006 | Block | G07F 19/20 | 235/379 |
| 2006/0273160 A1* | 12/2006 | Shepley | G07F 19/20 | 235/381 |
| 2008/0046333 A1* | 2/2008 | Kawakita | G06Q 10/0637 | 705/7.36 |
| 2009/0033489 A1* | 2/2009 | Black | G06Q 20/40145 | 340/541 |
| 2009/0083182 A1* | 3/2009 | Coventry | G06Q 20/1085 | 705/43 |
| 2009/0113459 A1* | 4/2009 | Miller | G06F 9/5027 | 719/328 |
| 2009/0199053 A1* | 8/2009 | Neilan | G07F 9/026 | 714/57 |
| 2010/0097940 A1* | 4/2010 | Asefa | H04L 43/0811 | 370/245 |
| 2010/0161343 A1* | 6/2010 | Kennedy | G06Q 10/06 | 705/1.1 |
| 2010/0204960 A1* | 8/2010 | Hagadone | G06F 11/3006 | 702/188 |
| 2010/0256865 A1* | 10/2010 | Ying | H04L 43/50 | 701/31.4 |
| 2010/0280878 A1* | 11/2010 | Wilson | G06Q 20/20 | 705/16 |
| 2010/0281155 A1* | 11/2010 | Cipollone | G06F 11/3013 | 709/224 |
| 2011/0054677 A1* | 3/2011 | Liddell | G06Q 10/06 | 700/236 |
| 2011/0106681 A1* | 5/2011 | Cockerell | G06Q 10/06 | 705/35 |
| 2011/0289360 A1* | 11/2011 | Cathro | G06F 11/3476 | 714/45 |
| 2012/0044154 A1* | 2/2012 | Black | G07F 19/205 | 345/173 |
| 2013/0103973 A1* | 4/2013 | Werth | G06F 9/4446 | 714/2 |
| 2014/0052484 A1* | 2/2014 | Bellamy | G06Q 10/06315 | 705/7.13 |
| 2014/0222378 A1* | 8/2014 | Piety | G05B 23/0283 | 702/183 |
| 2015/0046933 A1* | 2/2015 | Neilan | G06F 9/542 | 719/318 |
| 2015/0051731 A1* | 2/2015 | Neilan | G07D 11/0057 | 700/244 |
| 2015/0066564 A1* | 3/2015 | Neilan | G06Q 10/06315 | 705/7.25 |
| 2015/0178664 A1* | 6/2015 | Neilan | G06Q 10/063114 | 705/7.15 |

* cited by examiner

EVENT NOTIFICATION

FIELD OF INVENTION

The present invention relates to event notification. In particular, although not exclusively, the invention relates to notification about an event relating to a service operation at a self-service terminal (SST).

BACKGROUND OF INVENTION

SSTs, such as automated teller machines (ATMs), require servicing so that they remain in operation. ATMs require servicing to prevent and correct faults and also to replenish media that is being dispensed at the ATM. This media includes banknotes.

To provide efficient servicing of an ATM network, it is important to be able to monitor when a service engineer arrives at an ATM, when replenishment of the ATM is due, and other servicing events. Arrival of the service engineer is important for a number of reasons, including to enable a management center to time how long the service engineer takes to resolve the incident, to time how long the ATM is out of service, and the like.

At present, arrival of a service engineer at an ATM is typically implemented in one of two ways. The first way is for the service engineer to call a remote management center (typically the management center that dispatched the service engineer) so that an operator at that management center manually logs the service engineer as having arrived at that ATM at the time the phone call is received. The second way is for the ATM to detect when the ATM status has been changed from transaction mode to supervisor mode and to send an electronic notification of this event to the management center.

Both of these methods have problems. The service engineer may forget to call (or delay calling) the management center. If the automated method is used, then this may be triggered when the ATM is accessed by someone other than a service engineer, for example, a member of branch staff who is clearing a printer paper jam.

SUMMARY OF INVENTION

Accordingly, the invention generally provides methods, systems, apparatus, and software for automatically providing service operation notifications.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of providing a service operation event notification, the method comprising: receiving at a management application an indication of a service event at a media terminal, where the indication includes (i) a service event type and (ii) a service event time; and updating the management application to record the type of event and a time associated with that event.

The service event at a media terminal may comprise a human service event; that is, an event relating to a person being present at the media terminal.

The type of service event may comprise arrival of a service engineer at a media terminal. The time associated with that event may comprise an arrival time.

The type of service event may comprise a scheduled media replenishment event at a media terminal. The time associated with that event may comprise a time at which replenishment is scheduled to occur.

The method may include the step of indicating to a user of the management application the type of event and the time associated with that event.

The step of indicating to a user of the management application the type of event and a time associated with that event may be implemented by displaying on a visual representation of a media terminal network, the event type and time at the visual representation of that media terminal.

The step of receiving an indication of a service event may include receiving the indication from the media terminal across a network.

Alternatively, the step of receiving an indication of a service event may include receiving the indication from media replenishment software. The media replenishment software may be separate from, or incorporated into, the remote management application.

The media replenishment software may: (i) calculate an optimal or desired amount of media (such as banknotes) to be located at the media terminal, and (ii) transmit a media order to a media replenishment provider to replenish the media terminal with the optimal or desired amount of media.

The media replenishment software may transmit a media order to a media replenishment provider either directly or indirectly (for example, via the management application).

According to a second aspect there is provided a media terminal comprising: a system application operable to provide diagnostic and servicing functions; and a management agent executing on the terminal and being operable to: (i) detect when the system application is accessed, (ii) generate a service event in response to the system application being accessed, where the service event includes an event type and a time when the event occurred, and (iii) transmit the service event to a remote management application.

The event type may comprise a service engineer arrival event.

The management agent may be operable to detect when the system application is accessed by detecting launching of the system application. Alternatively, the management agent may be operable to detect when the system application is accessed by parsing a log file and deducing from the log file when the system application was accessed, for example, by identifying a system application started entry in that log file.

The management agent may be further operable to: detect when access to the system application ceases; generate a service event in response to the system application no longer being accessed; and transmit the service event to a remote management application, where the service event includes an event type and a time when the event occurred.

The event type may be a service engineer leaving event.

The management agent may comprise: an agent core, a plurality of collector components, and a transfer service.

The agent core may comprise: an agent configuration component; a rules engine component; a scheduling component; and an event filtering component.

The scheduling component may include details (programmed using the agent configuration component) about when information should be retrieved from the collectors associated with the managed devices and/or transmitted to the remote management application.

The transfer service component may be used to facilitate communications between the remote management application and the agent core.

The transfer service component may implement a known communications technology. For example, the transfer service may implement simple network management protocol (SNMP), Web services, a Background Intelligent Transfer Service (BITS), or the like.

The transfer service component may be operable to assign a unique sequence number and a time to each event that is transmitted to the remote management application.

The media terminal may comprise an automated teller machine, a self-checkout terminal, a payment terminal, or the like.

According to a third aspect there is provided a management agent for executing on a media terminal and being operable to: detect when a diagnostic application is accessed; generate a service event in response to the system application being accessed, where the service event includes an event type and a time when the event occurred; and transmit the service event to a remote management application.

According to a fourth aspect there is provided a system comprising a media terminal according to the second aspect and a remote management application.

According to a fifth aspect there is provided a management application operable to: (i) receive service events from a media terminal, (ii) receive replenishment information from a media replenishment application, (iii) present a graphical user interface to a user where the graphical user interface includes a representation of the media terminal and any replenishment information relevant to that media terminal, including a time when the next replenishment operation is scheduled for that terminal.

The media terminal may comprise an automated teller machine.

The graphical user interface may allow a user to select a media terminal and may present service events to the user, including an arrival time of a service engineer at that media terminal, a time when the service engineer left the media terminal, the total amount of time spent by service engineers at that media terminal over a selected time period (for example, a week, ten days, a month, a year, or the like).

The graphical user interface may provide a color-coded notification of the status of the media terminal.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
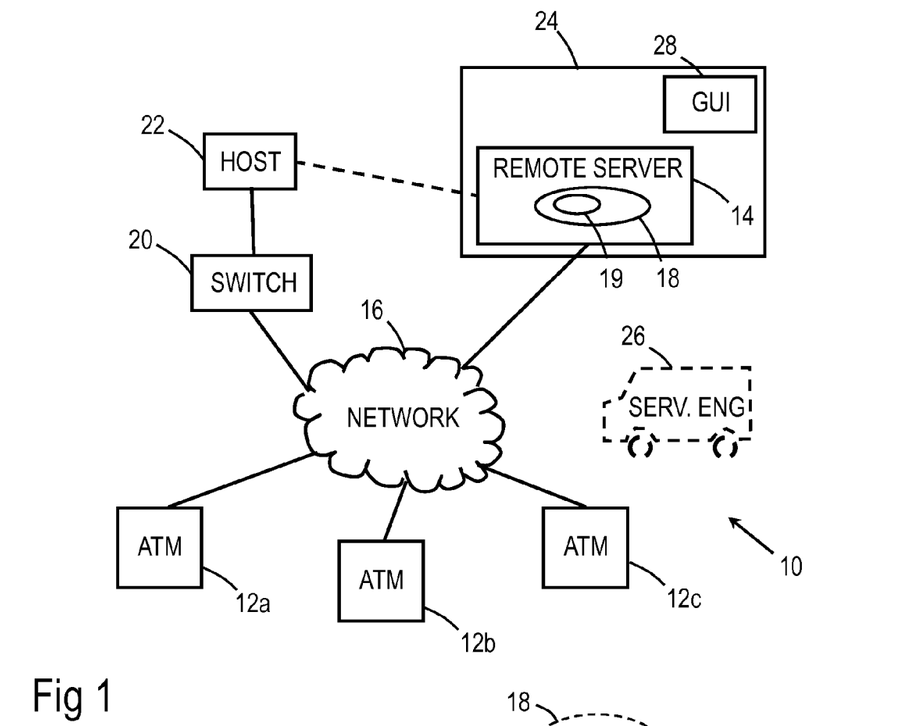
FIG. 1 is a simplified block diagram illustrating a system for providing a notification about an event relating to a service operation according to one embodiment of the present invention.

Reference is first made to FIG. 1, which is a block diagram illustrating a system 10 for providing a notification about an event relating to a service operation according to one embodiment of the present invention.

The system 10 comprises a plurality of self-service terminals 12 (only three of which are illustrated in FIG. 1) in the form of automated teller machines (ATMs) coupled to a remote management server 14 by an Internet Protocol (IP) network 16. A management application 18 executes on the remote management server 14 and is used to monitor the status and performance of the ATMs 12 in the system 10, and to schedule maintenance and replenishment operations for these ATMs 12.

The management application 18 also includes (or has access to) cash optimization software 19. In this embodiment the cash optimization software 19 is NCR APTRA OptiCash (trademark), available from NCR Corporation, the assignee of this patent application.

NCR APTRA OptiCash software 19 provides an advanced cash management solution that predicts the demand for currency at each media terminal (or other cash point), such as the ATMs 12, on an individual basis. By applying sophisticated mathematical algorithms to historical, event and cost data, the optimum cash position and delivery schedule for each cash point (or each currency cassette or cash drawer within a cash point) is determined.

The system 10 also comprises a conventional transaction switch 20 and an authorization server 22. As is known in the art, the transaction switch 20 is used to route transactions requested by a customer at one of the ATMs to a financial institution that maintains an account for that customer. For any transactions requested by customers of the owner of the system 10 (referred to as "on-us" transactions), the authorization server 22 provides the authorization approval or denial. For other transactions ("not-on-us" transactions) the transaction switch 20 routes the transaction request to an appropriate interchange network for approval. In this embodiment, the transaction switch 20 and the authorization server 22 are conventional, unmodified, devices similar to those currently used in conventional ATM networks.

The remote management server 14 is located within a call center 24 that dispatches a service engineer 26 to maintain and repair the ATMs 12 in the system 10. The remote management server 14 provides authorized users within the call center with a graphical user interface (GUI) 28 illustrating the ATMs 12 in the system 10. Each ATM 12 is depicted graphically, and event information associated with that ATM 12 is depicted beside the ATM 12 on the GUI 28. This allows an operator of the GUI 28 (each authorized user having an instance of the GUI 28 rendered on a his/her computer) to look at the ATM 12 and immediately see relevant event information associated with that ATM 12.

Figure 2:
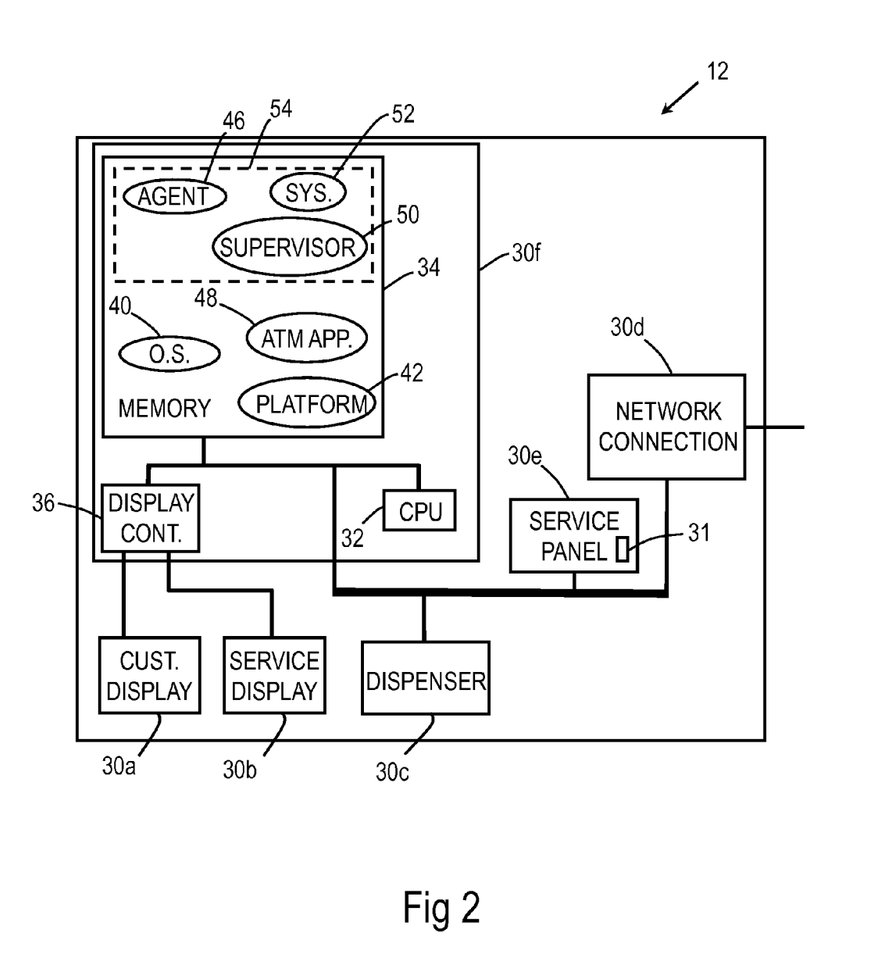
FIG. 2 is a simplified block diagram illustrating a media terminal (an ATM) of the system of FIG. 1 in more detail.

Reference is now also made to FIG. 2, which is a simplified block diagram illustrating one of the ATMs 12 of FIG. 1 in more detail.

Each ATM 12 includes a plurality of managed devices 30. As used herein, the term "managed device" has a broad meaning that encompasses software components, hardware components, and combined software and hardware components.

The managed devices include, inter alia, a customer display 30a, a service operator display 30b; a cash dispenser device 30c; a network device 30d for connecting to the IP network 16; a service panel 30e, and a controller device 30f (in the form of a PC core) for controlling the operation of the ATM 12, including the operation of other managed devices (not shown for simplicity of description).

The service panel 30e is used by a service engineer, a replenisher, and sometimes branch staff who are clearing paper jams. The service panel 30e includes a physical mode switch 31 (which in some embodiments may be a software switch or a logical switch, for example, provided on a touch-sensitive panel) that switches the ATM 12 between transaction mode and service mode, as described in more detail below.

The controller 30f comprises a microprocessor 32, associated main memory 34, and a display controller 36 in the form of a graphics card that controls both the customer display 30a and the service operator display 30b.

During operation of the ATM 12, various software components are loaded into, and execute in, the memory 34. These components include a conventional operating system 40 (in this embodiment a Microsoft (trade mark) Windows 7 (trade mark) operating system), platform components 42 for enhancing and extending the operating system for non-standard devices (such as the cash dispenser 30c, and the like), a distributed management agent 46, an ATM transaction application 48, a supervisor application 50, and a system application 52 accessible from (or incorporated into) the supervisor application 50.

The ATM 12 implements the CEN XFS standard so the ATM application 48 issues XFS format commands and requests. As is known in the art, CEN is the European Committee for Standardization, and XFS is the eXtensions for Financial Services standard.

To implement the XFS standard, the platform components 42 include an XFS manager (not shown in FIG. 2) and XFS service providers (not shown separately) associated with various managed devices 30 within the ATM 12. For example, there is an XFS service provider associated with the cash dispenser device 30c (or more accurately, associated with software associated with the cash dispenser device 30c, such as driver software and/or feature software). As is known in the art, the driver software implements the low-level commands to control the device in response to standard CEN commands received (from the ATM transaction application 48 or the supervisor application 50) via the XFS service provider for that device.

As is known in the art, the ATM application 48 controls the operation of the ATM 12 to allow customers to execute transactions. In this embodiment, the ATM application 48 is a conventional (unmodified) XFS-compliant ATM application.

The supervisor application 50 is operable to allow an authorized user to configure and service the ATM 12 (including maintaining the ATM 12, diagnosing faults in the ATM 12, and replenishing the ATM 12). The supervisor application 50 also uses the XFS standard to communicate with managed devices 30 within the ATM 12, and also communicates with the management agent 46.

The system application 52 is operable to facilitate access to diagnostic information (which may be vendor-dependent and may be accessed by non-XFS commands) and to provide servicing functions (such as performing self-tests on devices installed in the ATM 12) to an authorized person. An example of a suitable system application may be the "Sys-App" application, available from NCR Corporation. Another suitable application may be "Branch Aid" software, also available from NCR Corporation.

The combination of the management agent 46, the supervisor application 50, and the system application 52 comprises a local application 54 (shown in broken line in FIG. 2).

Figure 3:
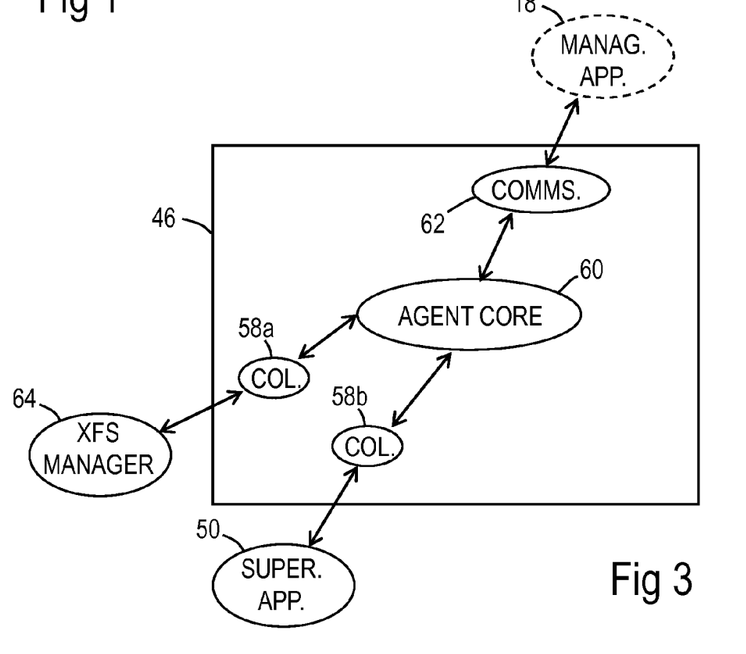
FIG. 3 is a simplified block diagram illustrating software components executing in a memory of the ATM of FIG. 2.

Reference will now also be made to FIG. 3, which is a simplified block diagram illustrating in more detail some of the software components executing in the memory 34 during operation of the ATM 12, particularly the management agent 46.

The management agent 46 includes various collector components 58 (only two of which are shown). The management agent 46 also comprises an agent core 60 that communicates with all of the collector components 58, and a transfer service component 62 that manages communication between the agent core 60 and the management application 18 (shown in broken line in FIG. 3 because it does not execute on the ATM 12).

Each collector component 58 is associated with at least one (but in some cases multiple) managed device(s). One of the collector components 58a (an XFS collector component) is associated with an XFS manager 64 (as will be explained in more detail below). Another of the collector components 58b (a supervisor collector component) is associated with the supervisor application 50 (as will be explained in more detail below). Various other collector components are also present but are not illustrated in FIG. 3 because they are not essential to an understanding of this embodiment.

The XFS collector component 58a communicates with the XFS manager 64 and the XFS service providers associated with the various managed devices 30 within the ATM 12. This enables the XFS collector component 58a to gather information from the relevant service providers, either by sending a request when the information is needed, or by sending requests according to a defined schedule (typically stored by the agent core 60).

The management agent 46 also includes a transfer service component 62 that manages communication between the agent core 60 and the management application 18 (FIG. 1). The transfer service component 62 assigns a unique sequence number to each event that is transmitted to the management application 18.

The combination of the agent core 60, the various collector components 58, and the transfer service component 62 comprise the management agent 46.

If the ATM 12 develops a fault, then the managed device 30 that experiences the fault creates an event that is detected by the appropriate collector component 58. The agent core 60 handles this event and forwards it, via the transfer service component 62, to the remote application 18. The remote application 18 updates the GUI 28 to indicate that a fault has been detected at the ATM 12 (for example, by adding a red dot or cross on or near the graphical representation of the ATM 12) and creates an electronic "ticket" for that fault. The remote application 18 assigns the fault (the ticket) to an authorized user within the call center 24, which they can see represented on the GUI 28 beside a representation of the ATM 12 experiencing the fault. The authorized user can then dispatch a service engineer to correct the fault by issuing a dispatch notice. The dispatch notice to the service engineer indicates the type and location of the ATM 12 and the type of fault that was detected by the ATM 12.

Figure 4:
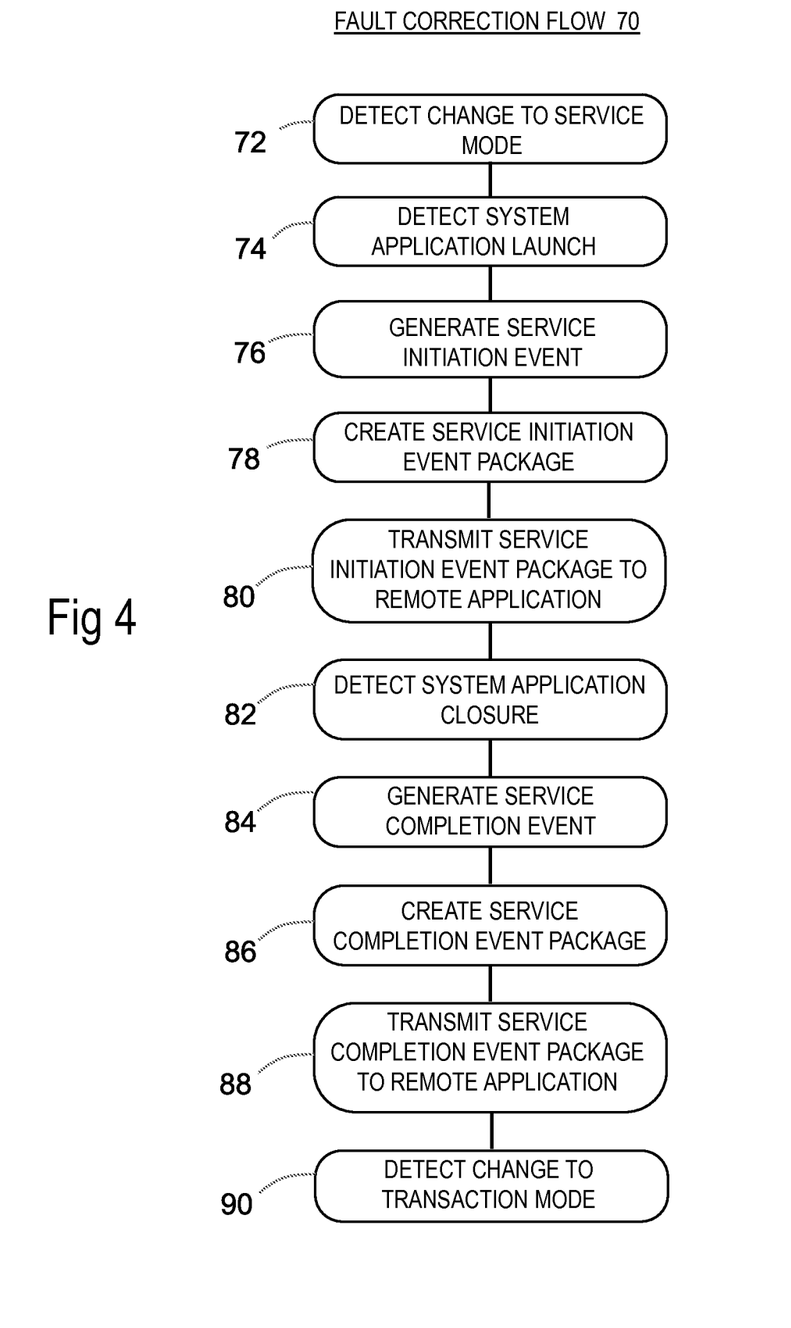
FIG. 4 is a flowchart illustrating steps performed by the ATM of FIG. 2 when a service engineer arrives to correct a fault at that ATM.

Reference will now also be made to FIG. 4, which is a flowchart 70 illustrating steps performed by the ATM 12 when the service engineer arrives at that ATM to correct the fault.

When the service engineer arrives, he or she opens up an access door (not shown) of the ATM 12 and presses the physical mode switch 31 (or software switch) to change the ATM 12 from transaction mode (in which the ATM transaction application 48 controls the ATM 12) to service mode (in which the supervisor application 50 controls the ATM 12). This causes the supervisor application 50 to launch. When this occurs, the management agent 46 detects this change (step 72). The agent core 60 is configured to log this event but not to transmit it to the remote application 18. One of the reasons for not transmitting this event is that the supervisor application 50 may have been launched by branch staff who are clearing a paper jam in the ATM 12.

To repair the fault, the service engineer accesses the system application 52 from a menu of options presented by the supervisor application 50 on the service display 30*b*. The system application 52 provides the service engineer with a rich data set of information, and allows the service engineer to perform diagnostic functions on the devices 30 in the ATM 12.

The supervisor collector component 58*b* detects this selection of the system application 52 (step 74) and generates a service initiation event (step 76); alternatively, the system application 52 may generate the service initiation event when it is invoked by the service engineer. The service initiation event has a unique event type so that it can be recognized by the agent core 60. The agent core 60 receives this service initiation event and appends an event time to the event to create a service initiation event package (step 78). The agent core 60 then conveys this event package to the transfer service component 62, which transmits the service initiation event package to the remote application 18 (step 80).

Once the service engineer has corrected the fault (which may involve cleaning the managed device that generated the fault, replacing all or part of that managed device, or the like) and tested the ATM 12 to ensure that it is working correctly, then the service engineer closes the system application 52 using an exit menu option presented by the system application 52 on the service display 30*b*. This closes the system application 52 and passes control back to the supervisor application 50.

The supervisor collector component 58*b* detects closure of the system application 52 (step 82) and generates a service completion event (step 84); alternatively, when the system application 52 is closed, the system application 52 may generate a service completion event directly. The service completion event has a unique event type so that it can be recognized by the agent core 60. The agent core 60 receives this service completion event and appends an event time to the event to create a service completion event package (step 86). The agent core 60 then conveys this event package to the transfer service component 62, which transmits the service completion event package to the remote application 18 (step 88).

The service engineer then presses the physical mode switch 31 to change the ATM 12 from service mode (in which the supervisor application 50 controls the ATM 12) to transaction mode (in which the ATM transaction application 48 controls the ATM 12). When this occurs, the management agent 46 detects this change (step 90). The agent core 60 is configured to log this event but not to transmit it to the remote application 18.

The service engineer then closes the access door (not shown) of the ATM 12, which completes the servicing process.

Figure 5:
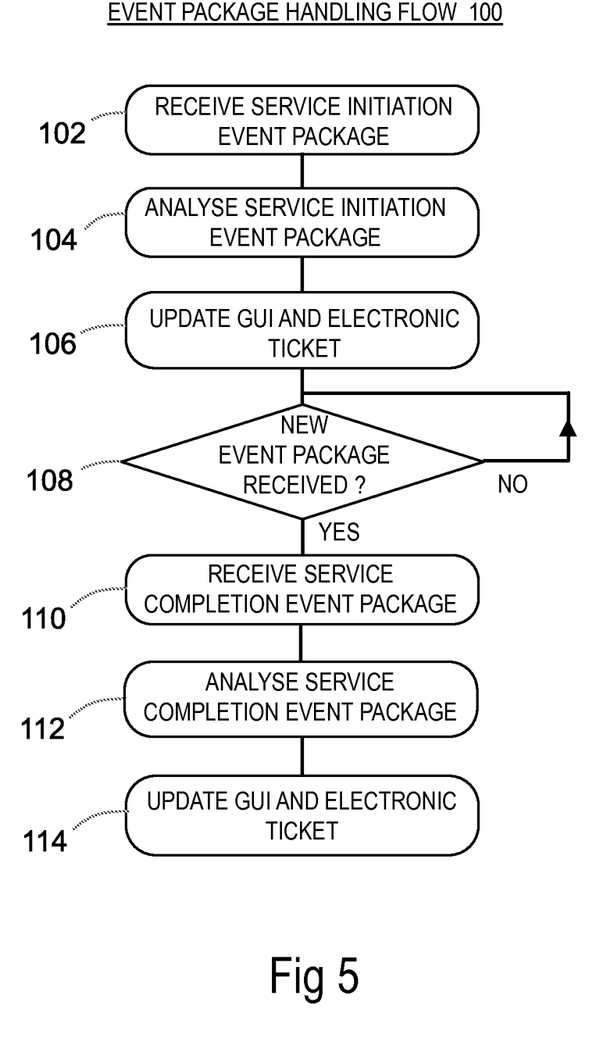
FIG. 5 is a flowchart illustrating steps performed by a remote application in the system of FIG. 1 in response to events received from the ATM of FIG. 2 while the service engineer is correcting a fault at that ATM.

Reference will now also be made to FIG. 5, which is a flowchart 100 illustrating steps performed by the remote application 18 in response to event packages received from the ATM 12.

Initially, the remote application 18 receives the service initiation event package from the transfer service component 62 (step 102).

The remote application 18 then analyses (parses) the service initiation event package (step 104) to identify: (i) the ATM 12 that transmitted the package, (ii) the type of event (in this example, it is an "engineer arrived" event), and (iii) the time of the event.

The remote application 18 then updates the GUI 28 and the electronic ticket for the fault being corrected to indicate the time that the service engineer arrived at the ATM 12 (step 106).

The remote application 18 then waits to receive the service completion event package (step 108)

Once the service engineer has corrected the fault, the remote application 18 receives the service completion event package from the transfer service component 62 (step 110).

The remote application 18 then analyses (parses) the service completion event package (step 112) to identify: (i) the ATM 12 that transmitted the package, (ii) the type of event (in this example, it is an "engineer left" event), and (iii) the time of the event.

The remote application 18 then updates the GUI 28 and the electronic ticket for the fault being corrected (step 114). This updating includes: indicating the time that the service engineer left the ATM 12, the total time spent at the ATM 12 by the service engineer, and removing the red dot or cross from the graphical representation of the ATM 12 (or replacing the red dot or cross with a green dot or tick). The electronic ticket is updated by closing the ticket.

It should now be appreciated that this embodiment has the advantage of providing accurate time recording of when a service engineer arrives at an ATM and when the service engineer leaves the ATM. It also provides a clear graphical representation of (i) the status of the ATM, and (ii) time information associated with a service engineer repairing that ATM.

In an alternative embodiment, instead of the supervisor collector component 58*b* detecting the system application 52 being launched or closed, a different collector component may be used to analyse a log file to identify an entry that corresponds to the system application 52 being launched or the system application 52 being closed. This collector component would then generate an event that would be handled by the agent core 60 in a similar manner to the way described above (that is, time stamped to create a package and forwarded to the transfer service component 62 for transmitting to the remote application 18).

Another embodiment will now be described. This embodiment relates to updating the GUI 28 as a result of a scheduled media replenishment operation for the ATM 12.

When the amount of media (such as currency) in the ATM 12 (or in any of the currency cassettes in the ATM 12) drops to a predefined level, the management agent 46 transmits an event to the remote application 18 to indicate that this has occurred. The remote application 18 updates the GUI 28 to provide a visual indication that the ATM 12 may have to stop providing currency withdrawal services because of insufficient currency. This may be implemented by an amber (orange) dot or cross at a graphical representation of the ATM 12.

In this embodiment, the cash optimization software 19 is responsible for scheduling cash replenishment for the ATM 12. The cash optimization software 19 predicts how much currency the ATM 12 will require, and when the currency should be delivered to the ATM 12 to optimize the currency replenishment schedule for the system 10 (which includes multiple ATMs 12). The remote application 18 uses this prediction to issue a currency replenishment order to a cash-in-transit (CIT) company (alternatively, the cash optimization software 19 may issue the currency replenishment order directly to the CIT company). When this occurs, the remote application 18 (or alternatively, the cash optimization software 19) creates a replenishment event for each of the ATMs 12 being replenished. For example, if five ATMs will be replenished as a result of the currency replenishment order, then the remote application 18 (or the cash optimization software 19) creates five different replenishment events, one for each ATM. Each replenishment event includes the time at which the replenishment is scheduled to occur for that ATM. In other words, each event may have a different time associated with it, and that time is not the same as the time the event was generated, which may also be recorded by the event. Each replenishment event may also include additional details, such as the replenisher name and other replenisher details, the amount to be replenished, which may include the cash denominations and cash counts for each physical position of cassette within an ATM (for example upper cassette and lower cassette in a two-high currency cassette ATM).

The remote application 18 (or alternatively, the cash optimization software 19) conveys these replenishment events to the GUI 28 for presenting to authorized users in the call center 24.

Each replenishment event identifies the ATM to be replenished and the time (day and hour, which may be precise or a time range) that the replenishment is scheduled to take place.

The GUI 28 uses these replenishment events to update the status of each ATM represented on the GUI 28. This enables an authorized user in the call center 24 to view the ATMs that are low on currency (those having an amber dot beside them) and to see when currency replenishment is due for each of those ATMs (the replenishment time being displayed next to the graphical representation of each ATM).

It should now be appreciated that this embodiment has the advantage that an authorized user can view an ATM on the GUI 28 that is running low on cash, but can also tell by looking at the GUI 28 that replenishment for that ATM has been scheduled. Furthermore, the authorized user can tell the time at which the scheduled replenishment will take place by looking at the ATM on the GUI 28.

Although some software described herein is referred to as a component, and other software may be referred to as a function, it should be appreciated that such software may be implemented in any convenient form, including as routines, objects, methods, procedures, libraries, or the like, and references in these embodiments to software as components is not intended to restrict the embodiments to any particular form of code.

Various modifications may be made to the above described embodiment within the scope of the invention, for example, in other embodiments, self-service terminals other than ATMs, or networks other than SSTs, may be used to implement the event handling function.

In other embodiments, the system 10 may not implement the CEN XFS standard; proprietary commands may be used instead. In other embodiments, such as embodiments in a retail environment, the OPOS standard may be used.

For simplicity of description only two collectors 58 are described above, but in other embodiments additional, or different, collectors may be used, such as an SNMP collector, a software distribution collector, a file document collector (for collecting information from third party devices that output information in a file format, such as XML), and the like.

In other embodiments, the management application 18 may execute on the authorization server 22 instead of on the remote management server 14 (there may be no remote management server 14).

In other embodiments, a single display may function as both the customer display and the service operator display.

In other embodiments, different visual representations of the status of a media terminal may be provided than those described above. For example, instead of colored dots, crosses, or ticks, the entire ATM may be rendered on the GUI 28 in a color indicating the status of that ATM (for example, red for out of service, amber for running low on media, green for operational and not running out of media).

In other embodiments, the supervisor collector component 58b may generate a service initiation event that includes an event time, so that the supervisor collector component 58b creates the service initiation event package directly.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method of providing a service operation event notification, the method comprising:
receiving at a management application an indication of a service event at a media terminal, wherein receiving further includes receiving the indication from a management agent executing on the media terminal that interacts with and controls managed devices of the media terminal through eXtension for Financial Services (XFS) communications, where the indication includes (i) a service event type, (ii) a service event time, and (iii) a unique sequence number uniquely identifying the service event, wherein receiving further includes, receiving, by the management agent, the service event from a collector component of the management agent that monitors a specific one of the managed devices and reporting, by the collector component, the service event to a transfer service component of the management agent, and transferring, by the transfer service component the service event to the management application, wherein the transfer service component assigns the unique sequence number to service event;
updating the management application to record the type of event and a time associated with that event, monitoring a status and performance of the media terminal in response to the updating;
scheduling maintenance and support in response to the monitoring, and wherein the unique sequence number is unique to the service event and assigning an authorized user to the unique sequence number, wherein scheduling further includes dispatching a service engineer for servicing the media terminal in accordance with scheduling maintenance; and
present a Graphical User Interface (GUI) that renders a color code representation of the media terminal indicative of the status associated with the media terminal based on the service event or other service events monitored for the media terminal.

2. A method according to claim 1, wherein the service event comprises an event relating to a person being present at the media terminal.

3. A method according to claim 1, wherein the type of service event comprises a scheduled media replenishment event at a media terminal and the time associated with that event comprises a time at which replenishment is scheduled to occur.

4. A method according to claim 1, wherein the method includes indicating to a user of the management application the type of event and the time associated with that event.

5. A method according to claim 4, wherein indicating to a user of the management application the type of event and a time associated with that event is implemented by displaying a visual representation of (i) a media terminal, and (ii) the event type and time associated with that media terminal.

6. A method according to claim 1, wherein receiving at a management application an indication of a service event includes receiving the indication from the media terminal across a network.

7. A method according to claim 1, wherein receiving at a management application an indication of a service event includes receiving the indication from media replenishment software.

8. A media terminal comprising:
a system application operable to provide diagnostic and servicing functions; and
a management agent executing on the terminal and being operable to communicate with and to control managed devices of the media terminal through eXtension for Financial Services (XFS) communications, and the management agent is further configured to:
(i) detect when the system application is accessed through an agent core of the management agent that monitors the system application; (ii) generate a service event in response to the system application being accessed, where the service event includes an event type, a time when the event occurred, and a unique sequence number that is unique to the service event; (iii) provide the service event to a transfer service component of the management agent that transmits the service event to a remote management application, the remote management application to monitor a status and performance of the media terminal for maintenance and support of the media terminal and assign an authorized user to the unique sequence number and dispatch a service engineer to the terminal based on the status, wherein the transfer service component assigns the unique sequence number to service event; and (iii) present a Graphical User Interface (GUI) that renders a color code representation of the media terminal indicative of the status associated with the media terminal based on the service event or other service events monitored for the media terminal.

9. A media terminal according to claim 8, wherein the agent core is operable to detect when the system application is accessed by detecting launching of the system application.

10. A media terminal according to claim 8, wherein the agent core is operable to detect when the system application is accessed by parsing a log file and deducing from the log file when the system application was accessed.

11. A media terminal according to claim 8, wherein the agent core is further operable to:
detect when access to the system application ceases;
generate a service event in response to the system application no longer being accessed, where the service event comprises a service engineer leaving event and a time when the event occurred;
provide the service event to the transfer service component, and the transfer service component is operable to transmit the service event to a remote management application.

12. A media terminal according to claim 8, wherein the media terminal comprises an automated teller machine.

13. A management application operable to:
(i) receive service events from a media terminal, each service event assigned a unique sequence number that is unique to that event, wherein the unique sequence number is assigned by a transfer service of the media terminal;
(ii) receive replenishment information from a media replenishment application;
(iii) present a graphical user interface to a user where the graphical user interface includes a representation of the media terminal and any replenishment information relevant to that media terminal, including a time when the next replenishment operation is scheduled for that terminal, and wherein the graphical user interface renders a color coded representation of the media terminal that discerns a status indication for the media terminal via the color coded representation; and (iv) monitor the status and performance of the media terminal in response to some of the events for maintenance and support of the media terminal provided by a collector component of a management agent executing on the media terminal, the collector component monitors managed devices of the media terminal, and the collector component provides select ones of the events to the transfer service of the management agent, and the transfer service communicates the select ones of the events as eXtension for Financial Services (XFS) communications to the management application, wherein the management application to assign an authorized user to particular events and to dispatch a service engineer to the media terminal based on the monitored status.

14. A management application according to claim 13, wherein the graphical user interface further includes a representation of currency to be provided as part of a replenishment operation associated with that media terminal, including the amount of currency and denomination for each currency cassette within that media terminal.

15. A management application according to claim 13, wherein the service events include an event type and an event time.

16. A management application according to claim 13, wherein the graphical user interface allows a user to select a media terminal and presents service events to the user, including an arrival time of a service engineer at that media terminal, a time when the service engineer left the media terminal, and the total amount of time spent by service engineers at that media terminal over a selected time period.

* * * * *